(12) United States Patent
Paprotna et al.

(10) Patent No.: US 7,434,402 B2
(45) Date of Patent: Oct. 14, 2008

(54) SYSTEM FOR ACTIVELY CONTROLLING COMPRESSOR CLEARANCES

(75) Inventors: Hubert Edward Paprotna, Winter Springs, FL (US); Adam Matthew Foust, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 511 days.

(21) Appl. No.: 11/092,775

(22) Filed: Mar. 29, 2005

(65) Prior Publication Data

US 2006/0225430 A1 Oct. 12, 2006

(51) Int. Cl.
  F02C 6/08 (2006.01)
  F02C 7/12 (2006.01)
  F02C 7/16 (2006.01)
  F02C 6/18 (2006.01)

(52) U.S. Cl. .................. 60/772; 60/782; 60/39.182; 60/806; 415/115; 415/178

(58) Field of Classification Search .................. 60/772, 60/782, 785, 806, 39.182; 415/115, 178
See application file for complete search history.

(56) References Cited

U.S. PATENT DOCUMENTS

| | | | |
|---|---|---|---|
| 4,069,662 A | 1/1978 | Redinger, Jr. et al. | |
| 4,268,221 A | 5/1981 | Monsarrat et al. | |
| 4,329,114 A | 5/1982 | Johnston et al. | |
| 4,338,061 A | 7/1982 | Beitler et al. | |
| 4,550,562 A * | 11/1985 | Rice ............................ | 60/772 |
| 4,648,241 A | 3/1987 | Putman et al. | |
| 4,928,240 A | 5/1990 | Davison et al. | |
| 5,076,050 A | 12/1991 | Schwarz et al. | |
| 5,127,794 A | 7/1992 | Burge et al. | |
| 5,147,178 A | 9/1992 | Treece | |
| 5,167,488 A * | 12/1992 | Ciokajlo et al. ............. | 415/175 |
| 5,169,287 A | 12/1992 | Proctor et al. | |
| 5,219,268 A | 6/1993 | Johnson | |
| 5,314,303 A * | 5/1994 | Charbonnel et al. ......... | 415/115 |
| 5,351,478 A | 10/1994 | Walker et al. | |
| 5,605,437 A * | 2/1997 | Meylan ....................... | 415/175 |
| 6,082,963 A | 7/2000 | Sexton et al. | |
| 6,352,404 B1 * | 3/2002 | Czachor et al. ............. | 415/178 |
| 6,354,795 B1 | 3/2002 | White et al. | |
| 6,454,529 B1 | 9/2002 | Zearbaugh et al. | |
| 6,607,350 B2 | 8/2003 | Dodd | |
| 6,625,989 B2 * | 9/2003 | Boeck .......................... | 60/782 |
| 6,626,635 B1 | 9/2003 | Prowse et al. | |
| 6,732,530 B2 * | 5/2004 | Laurello et al. ............... | 60/782 |

FOREIGN PATENT DOCUMENTS

JP  10077804 A  3/1998

* cited by examiner

Primary Examiner—Ted Kim (57) ABSTRACT

Aspects of the invention relate to a system and method for actively controlling compressor clearances in a turbine engine by passing a thermal fluid in heat exchanging relation through a compressor vane carrier. During some operational conditions, such as hot restart or spin cool, it may be desirable to heat the vane carrier to enlarge or at least prevent a decrease in compressor clearances. In such cases, a heated thermal fluid can be provided by reclaiming residual exhaust energy from a heat recovery steam generator. At any condition where improved performance is desired, such as at base load operation, the vane carrier can be cooled to minimize compressor clearances. A cooled thermal fluid can be bleed air from an upstream portion of the compressor, water-cooled high pressure bleed air from a downstream portion of the compressor, or feed water from the bottoming cycle in a combined cycle engine.

19 Claims, 11 Drawing Sheets

SYSTEM FOR ACTIVELY CONTROLLING COMPRESSOR CLEARANCES

FIELD OF THE INVENTION

The invention relates in general to turbine engines and, more specifically, to compressor clearance control.

BACKGROUND OF THE INVENTION

Figure 1:
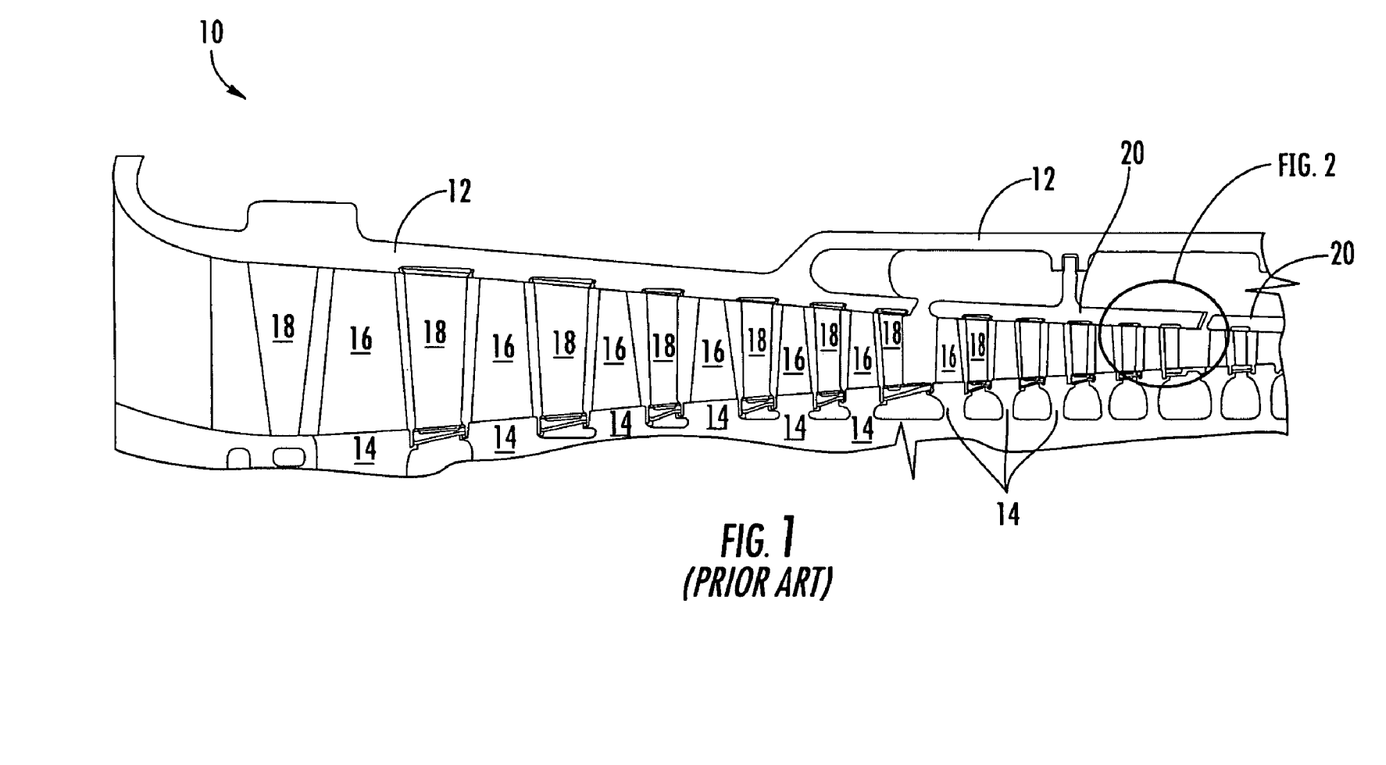
FIG. 1 is a cross-sectional view of the compressor section of a turbine engine.

As shown in FIG. 1, the compressor section 10 of a turbine engine is enclosed within an outer casing 12. The compressor can include a rotor (not shown) with a plurality of axially spaced discs 14. Each disc 14 can host a row of rotating airfoils, commonly referred to as blades 16. The rows of blades 16 alternate with rows of stationary airfoils or vanes 18. The vanes 18 can be provided as individual vanes, or they can be provided in groups such as in the form of a diaphragm. The vanes 18 can be mounted in the compressor section 10 in various ways. For example, one or more rows of vanes 18 can be attached to and extend radially inward from the compressor shell 12. In addition, one or more rows of vanes 18 can be hosted by a blade ring or vane carrier 20 and extend radially inward therefrom.

Figure 2:
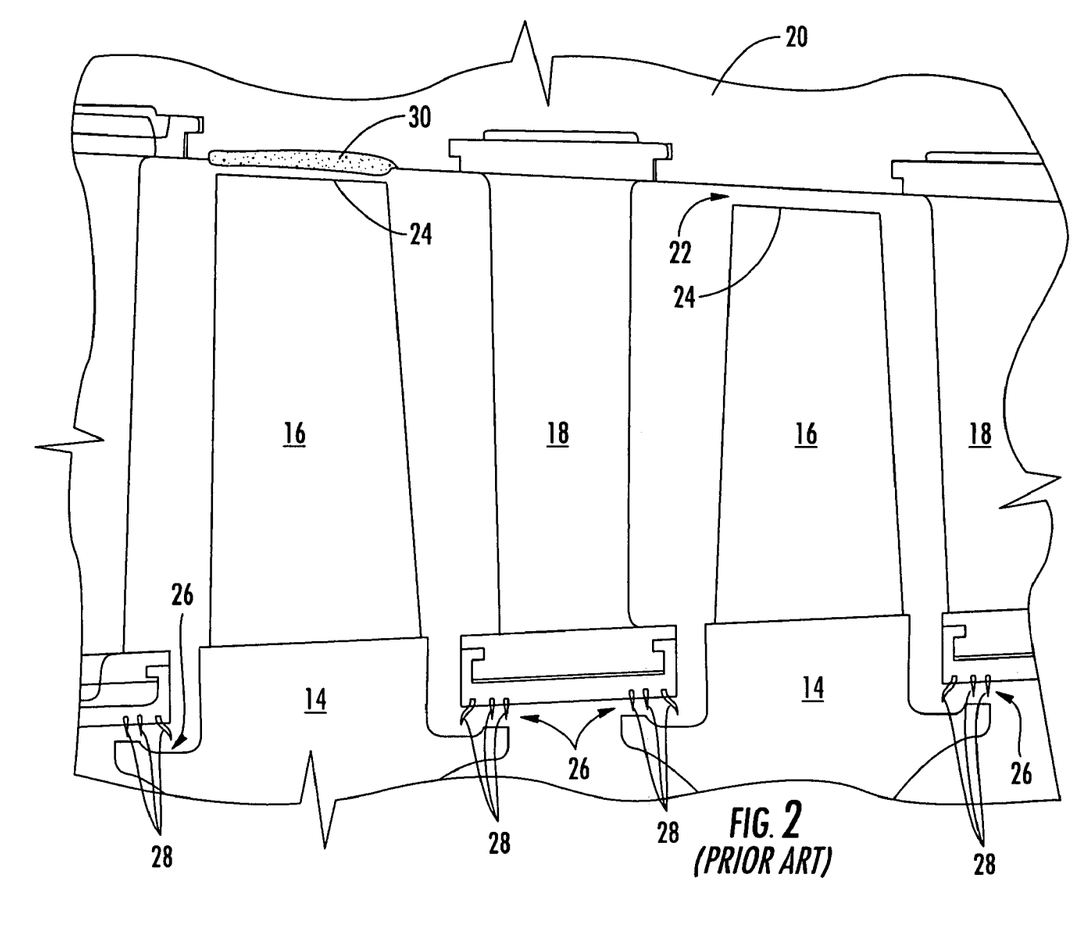
FIG. 2 is a close-up view of a portion of the compressor section, showing the various compressor clearances.

The compressor section 10 contains several areas in which there is a gap or clearance between the rotating and stationary components. During engine operation, fluid leakage through clearances in the compressor section 10 contributes to system losses, making the operational efficiency of a turbine engine less than the theoretical maximum. FIG. 2 shows three areas in which flow leakage can occur. First, leakage can occur across a clearance 22 between the tips 24 of the rotating compressor blades 16 and the surrounding stationary structure, such as the outer casing 12 or the vane carrier 20. Second, there are clearances 26 between one or more compressor seals 28 provided on the vanes 18 and a portion of the rotating compressor disc 14. Third, for cantilevered type vanes 18, there can be a clearance between the tips of the compressor vanes 18 and the substantially adjacent rotating structure (not shown).

Small clearances are desired to keep air leakage to a minimum; however, it is critical to maintain a clearance between the rotating and stationary components at all times. Rubbing of any of the rotating and stationary components can lead to substantial component damage, performance degradation, and extended outages. The size of each of the compressor clearances change during engine transient operation due to the difference in the thermal inertia of the rotor and discs 14 compared to the thermal inertia of the stationary structure, such as the outer casing 12 or the vane carrier 20. Because the thermal inertia of the vane carriers 20 are significantly less than the rotor, the vane carrier 20 has a faster thermal response time and responds (through expansion or contraction) more quickly to a change in temperature than the rotor.

Many prior efforts have focused on the avoidance of blade tip rubbing. For instance, large tip clearances 22 are initially provided so that the blade tips 24 do not rub during non-standard engine conditions where the clearances 22 would otherwise be expected to be the smallest. Examples of such non-standard operating conditions include hot restart (such as, restarting the engine soon after shutdown), spin cool, etc. However, because the minimum tip clearances 22 are sized for these off design conditions, the clearances 22 become overly large during normal engine operation, such as at base load. Consequently, the compressor and the engine overall can experience measurable performance decreases in power and efficiency due to tip clearance leakage.

Other prior approaches for addressing the tip rubbing issue have included providing abradable coatings 30 on the vane carriers 20 or other stationary structure. The abradable coatings 30 are made of a material that is softer than the compressor blades 16, so the tips 24 of the blades 16 can rub against the coating 30 without being damaged. However, in the end, the abradable coating 30 is rubbed away, resulting in a larger tip clearance 22 than is desired during normal operation. In addition, the spallation of the coating 30 has resulted in large patches of uncoated surfaces. Again, all of the above approaches only address the blade tip clearance 22 and not the other compressor clearances previously discussed.

Thus, there is a need for a system that can improve engine performance by controlling the various compressor clearances.

SUMMARY OF THE INVENTION

Aspects of the invention relate to an active clearance control system for the compressor section of a turbine engine, which also includes a combustor section and a turbine section. The system includes an outer casing as well as a vane carrier enclosed within and attached to the outer casing. One or more channels extend substantially axially through the vane carrier. The channel has a first end and a second end.

The system includes a supply passage and a discharge passage. The supply passage is in fluid communication with the first end of the channel. In one embodiment, there can be a supply plenum in the vane carrier, which can be connected in fluid communication to the supply passage and the first end of the one or more channels. The discharge passage is in fluid communication with the second end of the channel. A discharge plenum can be provided in the vane carrier; the discharge plenum can be connected in fluid communication to the discharge passage and the second end of the one or more channels. The discharge passage can also be in fluid communication with the compressor, the atmosphere, the turbine, a heat recovery steam generator, or a thermal fluid source fluidly connected to the supply passage.

A fluid can flow through the one or more channels. The fluid can be compressor air, economizer water, spray cooled compressor air, turbine exhaust gas, or a thermal fluid. The fluid can be passed in heat exchanging relation through the channel so as to control the thermal growth and contraction of the vane carrier and to control compressor clearances.

The vane carrier can be at a first temperature, and the thermal fluid can be at a second temperature. In one embodiment, the second temperature can be greater than the first temperature. Thus, the temperature of the vane carrier can be raised above the first temperature after the thermal fluid is passed through the channel. Consequently, the compressor clearances can be enlarged or at least maintained during non-standard operating conditions. In another embodiment, the second temperature can be less than the first temperature. Thus, the temperature of the vane carrier can be lowered below the first temperature after the thermal fluid is passed through the channel. As a result, the compressor clearances can be reduced or at least maintained during operating conditions where improved engine performance is desired.

In another respect, aspects of the invention are directed to a method of actively controlling compressor clearances. According to the method, a turbine engine is provided. The engine includes a compressor, which has a vane carrier. One or more channels extend substantially axially through the vane carrier. The vane carrier is at a first temperature. Further, a thermal fluid is provided. In one embodiment, the thermal fluid can be turbine exhaust gas. In such case, the method can further include the step of extracting a portion of gas from the engine exhaust. The thermal fluid is at a second temperature, which is greater than the first temperature.

According to aspects of the invention, the thermal fluid is passed in heat exchanging relation through the one or more channels in the vane carrier so as to increase the temperature of the blade ring above the first temperature. As a result, the vane carrier radially expands or, at a minimum, radial contraction of the vane carrier is minimized. Each of the above steps can be performed prior to a hot restart and/or a spin cool of the engine.

The thermal fluid can be heated to the second temperature. In one embodiment, the thermal fluid can be heated to the second temperature by passing the thermal fluid in heat exchanging relation with a heat recovery steam generator after engine shutdown. The thermal fluid can be recirculated in heat exchanging relation with the heat recovery steam generator. Thus, a closed loop heat exchange circuit can be formed. In another embodiment, the turbine engine can be a combined cycle engine having a bottoming cycle. In such case, the thermal fluid can be heated to the second temperature by passing the thermal fluid in heat exchanging relation with a portion of the bottoming cycle.

Aspects of the invention include another method of actively controlling compressor clearances. A turbine engine is provided. The engine includes a compressor that has a vane carrier. One or more channels extend substantially axially through the vane carrier. The vane carrier is at a first temperature. A fluid at a second temperature is also provided. The second temperature is lower than the first temperature.

The fluid is passed in heat exchanging relation through the one or more channels so as to lower the temperature of the vane carrier below the first temperature. As a result, the vane carrier radially contracts or at least radial expansion of the vane carrier is minimized.

In one embodiment, the fluid is compressor air. Accordingly, the method can further involve extracting air from a portion of the compressor upstream of the vane carrier. Alternatively, the method can include the steps of extracting air from a portion of the compressor downstream of the vane carrier and spray cooling the extracted air with water. After passing through the at least one channel, the fluid can be discharged the atmosphere, the gas path of the compressor upstream of the vane carrier, or the turbine portion of the engine.

In another embodiment, the fluid can be high pressure water. Thus, the method can include the step of directing high pressure water from an economizer to the one or more channels in the vane carrier. After the fluid is passed through the one or more channels, the fluid can be routed to a heat recovery steam generator.

DETAILED DESCRIPTION OF EMBODIMENTS OF THE INVENTION

Embodiments of the present invention address the shortcomings of prior compressor clearance control systems by providing a vane carrier adapted to receive a thermal fluid for altering the temperature of the vane carrier. Embodiments of the invention will be explained in connection with various possible vane carrier heating and cooling systems and methods, but the detailed description is intended only as exemplary. Embodiments of the invention are shown in FIGS. 3-9, but the present invention is not limited to the illustrated structure or application.

Figure 3:
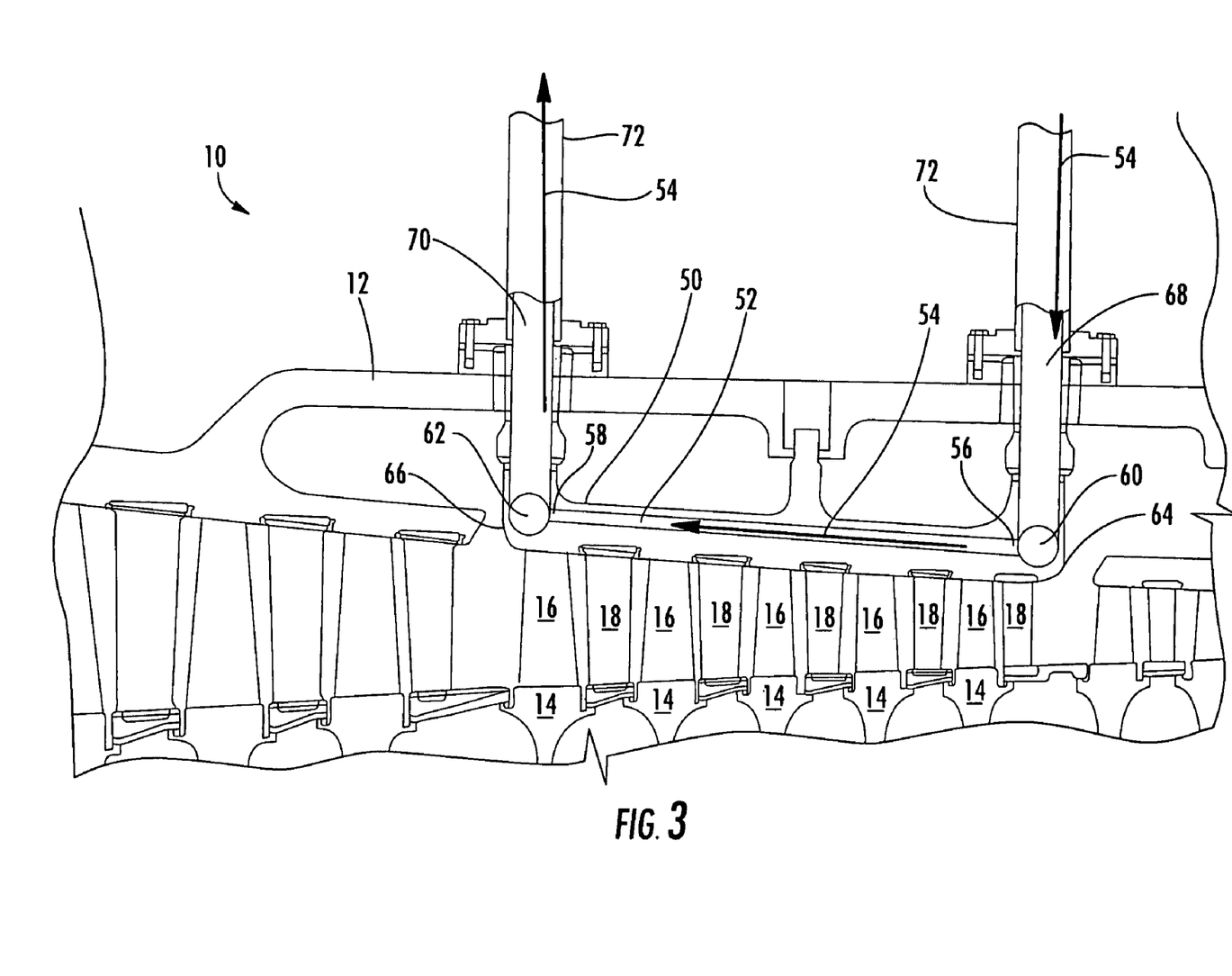
FIG. 3 is a cross-sectional view of a compressor section with a blade ring configured according to aspects of the invention.

A blade ring or vane carrier 50 configured according to aspects of the invention is shown in FIG. 3. The vane carrier 50 can be generally cylindrical in conformation. The vane carrier 50 can be a single piece, or the vane carrier 50 can be made of multiple pieces. For example, the vane carrier 50 can be made of two semi-cylindrical halves. It will be understood that aspects of the invention can be applied to any of vane carrier regardless of the configuration and that the term "vane carrier" or "blade ring," as used herein refers to any of such vane carrier configurations.

According to embodiments of the invention, at least one channel 52 can extend through the vane carrier 50. The channel 52 can extend generally in the axial direction relative to the compressor 10. Preferably, the channel 52 spans a substantial portion of the axial length of the vane carrier 50. The channel 52 can receive and permit the flow of a heat exchanging fluid 54 through the vane carrier 50 to either increase or decrease the temperature of the vane carrier 50, as will be explained in detail below. There can be any number of channels 52 in the vane carrier 50, and embodiments of the invention are not limited to any particular number of channels 52. For example, there can be a single channel 52 extending through the vane carrier 50. In one embodiment, there can be two channels 52 in the vane carrier 50. In another embodiment, there can be four channels 52 in the vane carrier 50. In cases where multiple channels 52 are provided, the channels 52 can be substantially equally spaced about the vane carrier 50 in the circumferential direction. Embodiments of the invention also include channels 52 that are not equally spaced. The channel 52 can be substantially straight. In one embodiment, the channel 52 can be curved, bent or otherwise non-straight.

The channels 52 can have any of a number of cross-sectional shapes. In one embodiment, the channels 52 can be substantially circular. Other conformations include oval, rectangular, and polygonal, just to name a few possibilities. The cross-section area of the channels 52 can be substantially constant, or it can vary along the length of the channel 52. In the case of multiple channels 52, the channels 52 can have substantially identical cross-sectional geometries and areas, but at least one of the channels 52 can be different in any of the above respects. Further, the multiple channels 52 may or may not be substantially parallel to each other.

The vane carrier 50 can be made of various materials including metals. The channels 52 can be provided in the vane carrier 50 by, for example, machining or casting.

The channel 52 can have a first axial end 56 and a second axial end 58. The first axial end 56 of the channel 52 can be in fluid communication with a supply plenum 60, and the second axial end 58 can be in fluid communication with a discharge plenum 62. While FIG. 3 shows the supply plenum 56 located near the axial downstream end 64 of the vane carrier 50 and the discharge plenum 62 located near the axial upstream end 66 of the vane carrier 50, it will be understood that aspects of the invention are not limited to this arrangement. It will be readily appreciated that the opposite arrangement can be provided, that is, the supply plenum 60 can be provided near the axial upstream end 66 of the vane carrier 50, and the discharge plenum 62 can be provided near the axial downstream end 64 of the vane carrier 50.

There can be any number of plenums 60, 62. For instance, there can be a single supply plenum 60 and/or discharge plenum 62 in fluid communication with the one or more channels 52. Alternatively, there can be more than one supply plenum 60 and/or discharge plenum 62. In such case, each supply plenum 60 and each discharge plenum 62 can be in fluid communication with at least one of the channels 52. The number of supply plenums 60 may or may not be equal to the number of discharge plenums 62.

The plenums 60, 62 can extend substantially circumferentially through at least a portion of the vane carrier 50. The plenums 60, 62 can have various cross-sectional geometries and surface contours, and the above discussion of such features in the context of the channels 52 is equally applicable here.

The thermal fluid 54 can be delivered to the supply plenum 60 by way of an inlet passage 68 in fluid communication with the supply plenum 60. Likewise, the thermal fluid 54 can exit the discharge plenum 62 by way of an outlet passage 70 in fluid communication with the discharge plenum 62. Thus, after being routed to the supply plenum 60, the thermal fluid 54 can flow through the channel 52 and into the discharge plenum 62 for exhaust or reuse elsewhere.

The inlet and outlet passages 68, 70 can be defined by, for example, one or more pipes 72 or fittings. At least a portion of each of the passages 68, 70 can be defined in the vane carrier 50. The passages 68, 70 can be substantially straight or they can include one or more bends or curves. The pipes 72 can run external to the compressor shell 12 and can be connected in fluid communication with various fluid source and discharge locations, as will be explained in more detail below. The pipes 72 or other structure forming the passages 68, 70 can be connected to the vane carrier 50 in any of a number of ways including, for example, threaded engagement or other mechanical engagement.

The inlet and outlet passages 68, 70 can have any cross-sectional shape, In one embodiment, the inlet and outlet passages 68, 70 can be substantially circular. The cross-sectional area of the inlet and outlet passages 68, 70 can be substantially constant or it can vary along the length of the passages 68, 70. There can be any number of inlet and outlet passages 68, 70. In one embodiment, there can a single inlet passage 68 and a single outlet passage 70. In another embodiment, there can be at least two inlet passages 68 and/or at least two outlet passages 70. The number of inlet passages 68 may or may not be equal to the number of outlet passages 70.

Because the vane carrier 50 can host one or more rows of vanes 18, any radial movement of the vane carrier 50 can affect the radial position of the vanes 18. Again, at least some of the compressor clearances of concern are defined between a rotating component and one of the vane carrier 50 and the vanes 18. Thus, it will be appreciated that compressor clearances can be managed by selectively controlling the movement of the vane carrier 50 in the radial direction.

At various times, it may be desirable to increase the temperature of the vane carrier 50 so as to cause the vane carrier 50 to thermally expand in the radial direction (relative to the compressor 10) or to at least prevent the vane carrier 50 from contracting at a faster rate than the rotating components including the rotor and discs 14. Any radial movement of the vane carrier 50 correspondingly affects the radial position of the vanes 18. By heating the vane carrier 50, the compressor clearances can be increased to avoid contact between the stationary and rotating components. Such enlargement of the clearances can be beneficial during pinch point operational conditions. Examples of operational conditions in which heating of the vane carrier 50 may be desired are during hot or otherwise non-cold start-up as well as during spin cooling.

Figure 4:
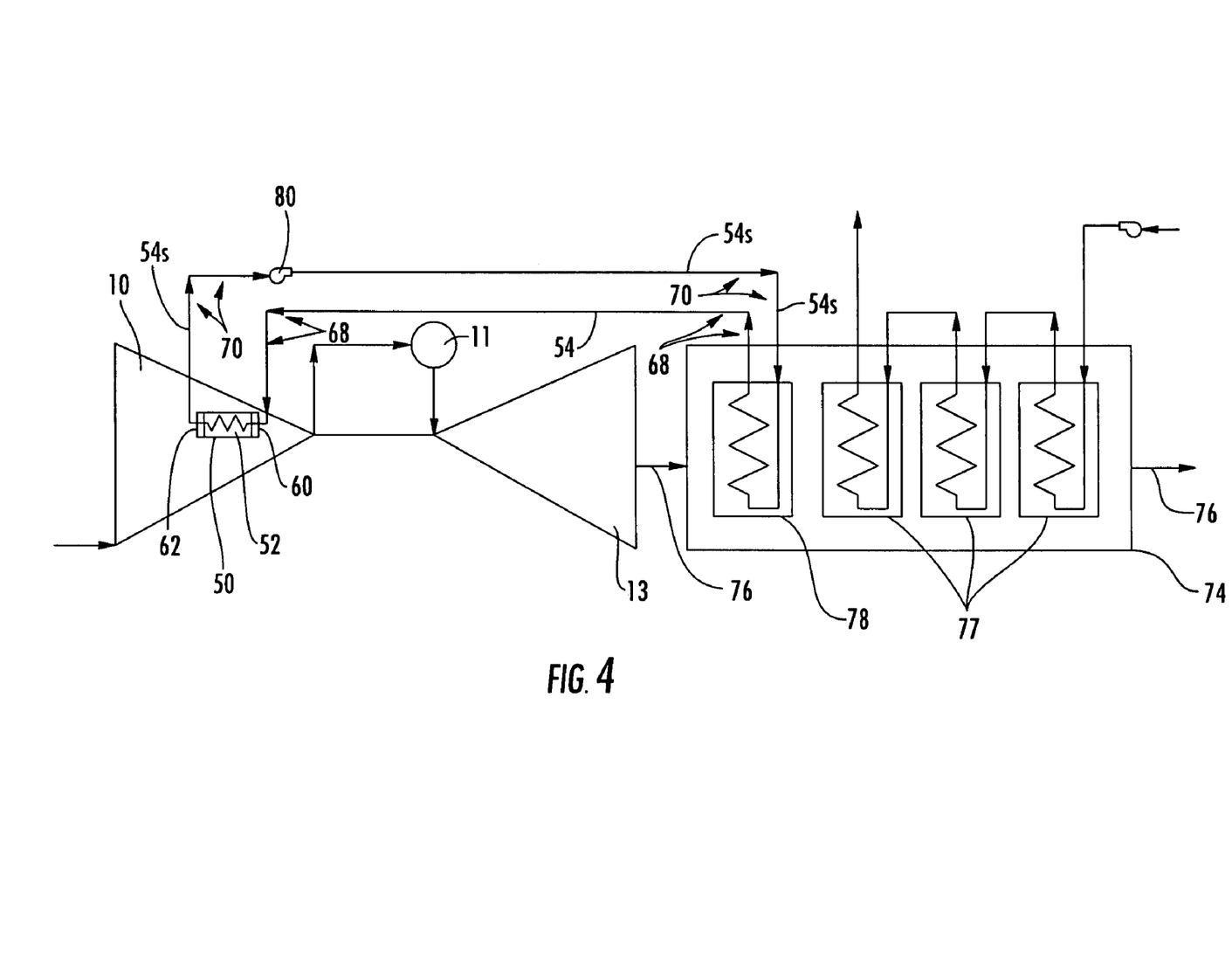
FIG. 4 is a diagrammatic view of a first blade ring heating system according to aspects of the invention.

One embodiment of a vane carrier heating system according to aspects of the invention is shown in FIG. 4. The system can include the compressor 10, a combustor 11 and a turbine section 13. According to aspects of the invention, the thermal fluid 54 can be heated before it is delivered to the supply plenum 60 by reclaiming residual exhaust energy (in the form of heat) from a heat recovery steam generator (HRSG) 74. In a combined cycles engine, the HRSG 74 can be used to generate steam by extracting energy from the turbine exhaust 76. To that end, the HRSG 74 can be placed in the flow path of the turbine exhaust 76. The HRSG 74 can be made of metal and can include a plurality of heat exchangers 77. Experience has shown that the HRSG 74 can remain at a high temperature for several hours after an engine shutdown.

According to embodiments of the invention, the thermal fluid 54 can be passed in heat exchanging relation with the HRSG 74 before being routed to the channel 52. To that end, the HRSG 74 can be equipped with one or more heat exchangers 78 dedicated for heating the thermal fluid 54. For instance, prior to initiating a hot restart, spin cool or other pinch point operational condition, the thermal fluid 54 can be heated by flowing through the heat exchanger 78 in the HRSG 74. The thermal fluid 54 can be heated to a temperature that is greater than the temperature of the vane carrier 50.

The heated thermal fluid 54 can be delivered to the supply plenum 60 by the inlet passage 68, which can be connected, either directly or indirectly, to the HRSG 74. The heated thermal fluid 54 can then be circulated through the channel 52 so as to exchange heat with the vane carrier 50. Naturally, the temperature of the thermal fluid 54 exiting the vane carrier 54*s* (the spent fluid) has decreased from when the thermal fluid 54 first entered the vane carrier 50. In contrast, the temperature of the vane carrier 50 has increased as a result of such heat exchanging interaction.

The spent thermal fluid 54*s* can be rerouted to the HRSG 74 to reclaim additional heat. In such case, the outlet passage 70 can be connected, directly or indirectly, in fluid communication with the heat exchanger 78. A pump 80 can be disposed along the outlet passage 70 to move the spent thermal fluid 54*s* along the outlet passage 70.

Figure 5:
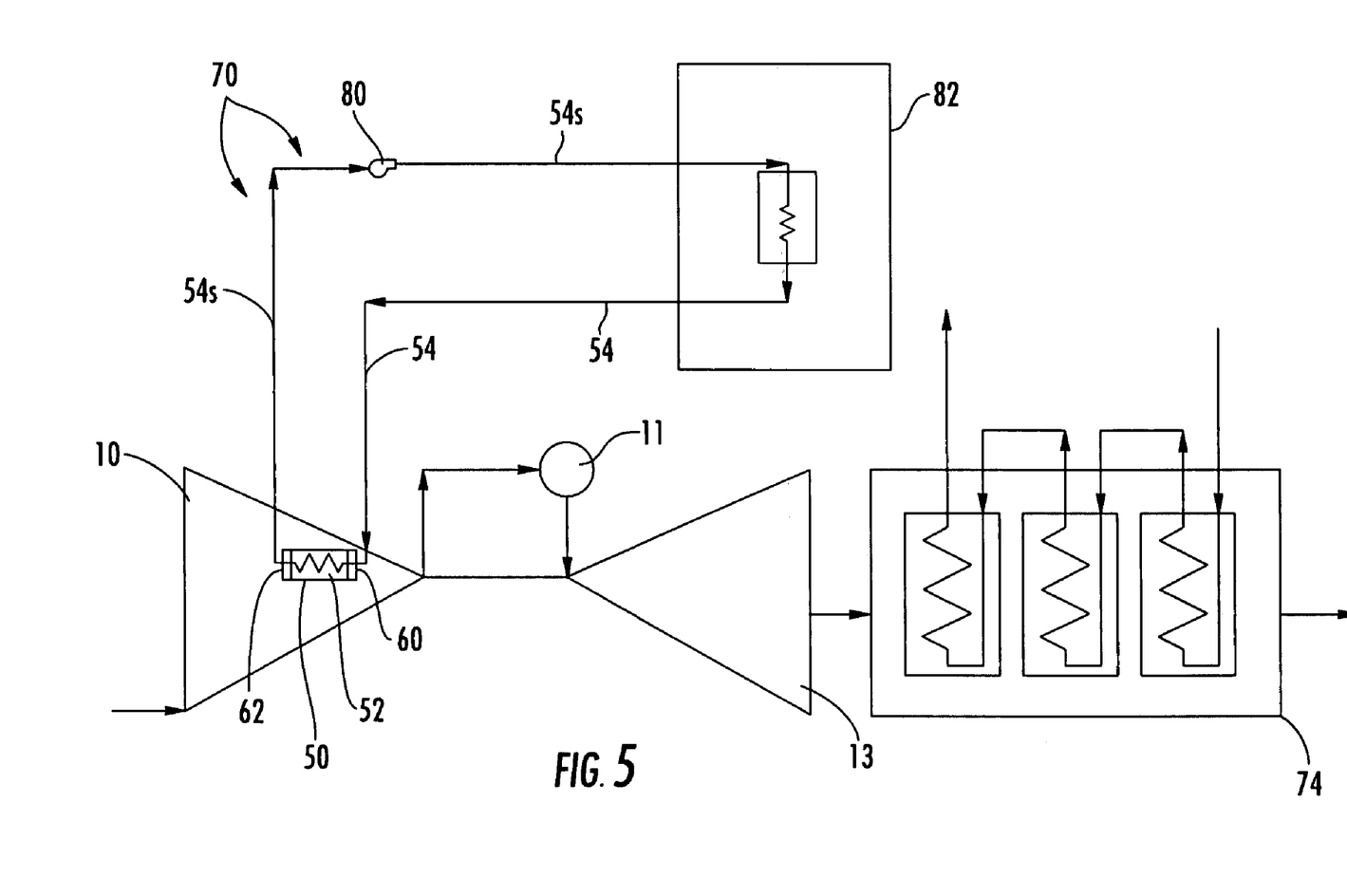
FIG. 5 is a diagrammatic view of a second blade ring heating system according to aspects of the invention.

There are other ways of heating the vane carrier 50 in accordance with aspects of the invention. For example, the thermal fluid 54 can be heated using heat from a different location in the bottoming cycle (steam cycle) 82 of a combined cycle engine, as shown in FIG. 5. After passing through the channel 52, the spent thermal fluid 54s can be routed to the bottoming cycle 82. A pump 80 can be disposed along the outlet passage 70 to move the spent thermal fluid 54s along the outlet passage 70.

Figure 6:
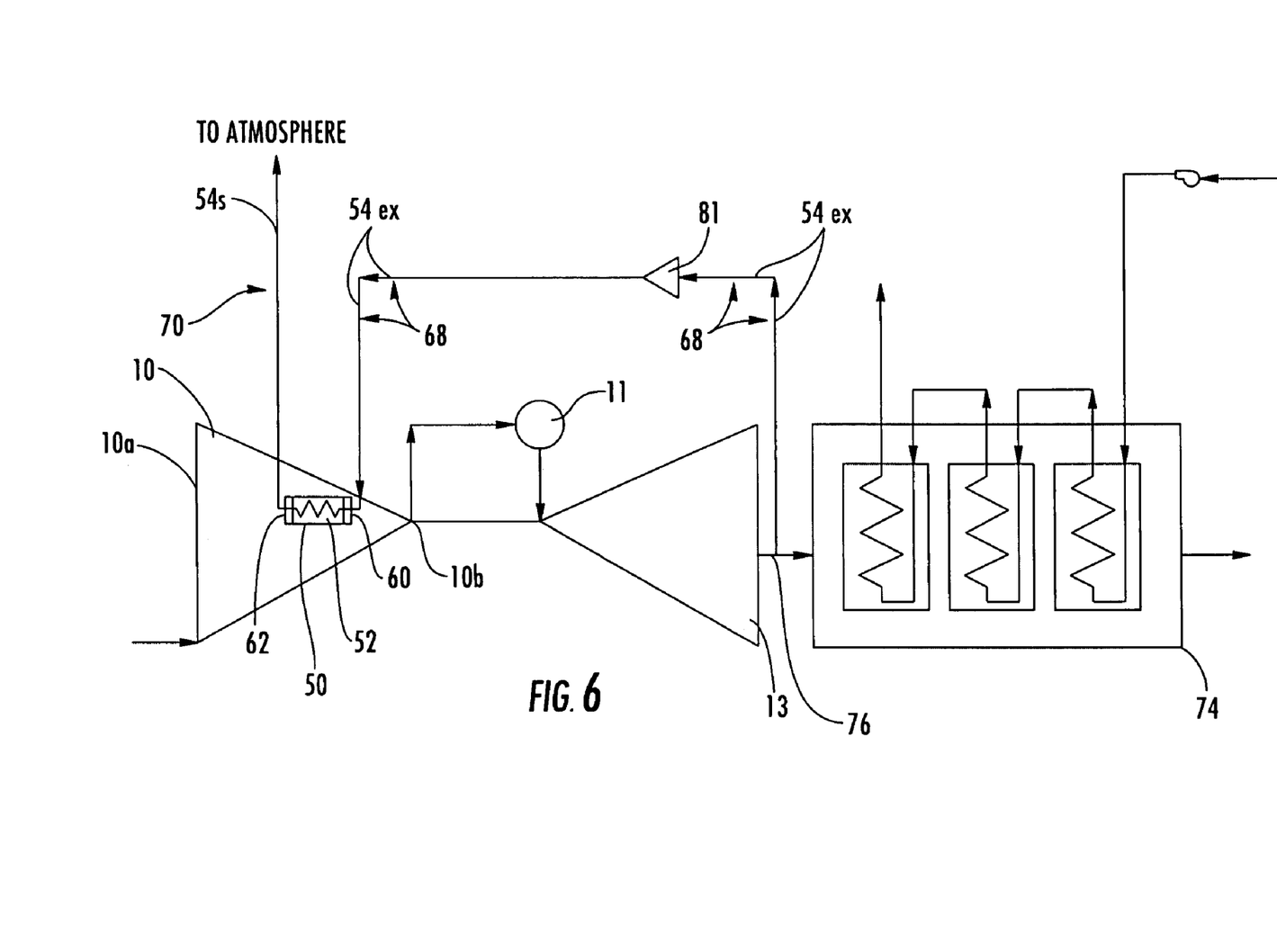
FIG. 6 is a diagrammatic view of a third blade ring heating system according to aspects of the invention.

In another embodiment, shown in FIG. 6, the thermal fluid can be a portion of gas 54ex taken directly from the turbine exhaust 76. Because the temperature of the exhaust gas 54ex will be higher than the temperature of the vane carrier 50, the exhaust gas 54ex can be used to heat the vane carrier 50.

The exhaust gas 54ex can be extracted from the turbine exhaust 76 and routed directly to the supply plenum 60 by the inlet passage 68. A blower/fan 81 can be provided along the inlet passage 68 to facilitate the routing of the exhaust gas 54ex to the channel 52. The exhaust gas 54ex can then be circulated through the channel 52 so as to exchange heat with the vane carrier 50. Consequently, the temperature of the thermal fluid 54s exiting the vane carrier 50 (the spent fluid 54s) can decrease from when the thermal fluid 54ex first entered the vane carrier 50. In contrast, the temperature of the vane carrier 50 can increase as a result of such heat exchanging interaction.

The spent thermal fluid 54s can be discharged to the atmosphere, as shown in FIG. 6, or it can be routed to another part of the engine.

In addition to heating the vane carrier 50, aspects of the invention include systems and methods for cooling the vane carrier 50 or at least for preventing the vane carrier 50 from thermally expanding at a faster rate than the rotating components including the rotor and discs 14. In some instances, it may be desirable to cool the vane carrier 50 so that the vane carrier 50 thermally contracts in the radial direction or at least to substantially prevent the vane carrier 50 from expanding in the radial direction. Examples of such instance can include any operating point in which improved engine performance is desired, such as at base load operation. Contraction of the vane carrier 50 and/or vanes 18 can reduce compressor clearances to thereby improve engine performance.

Figure 7A:
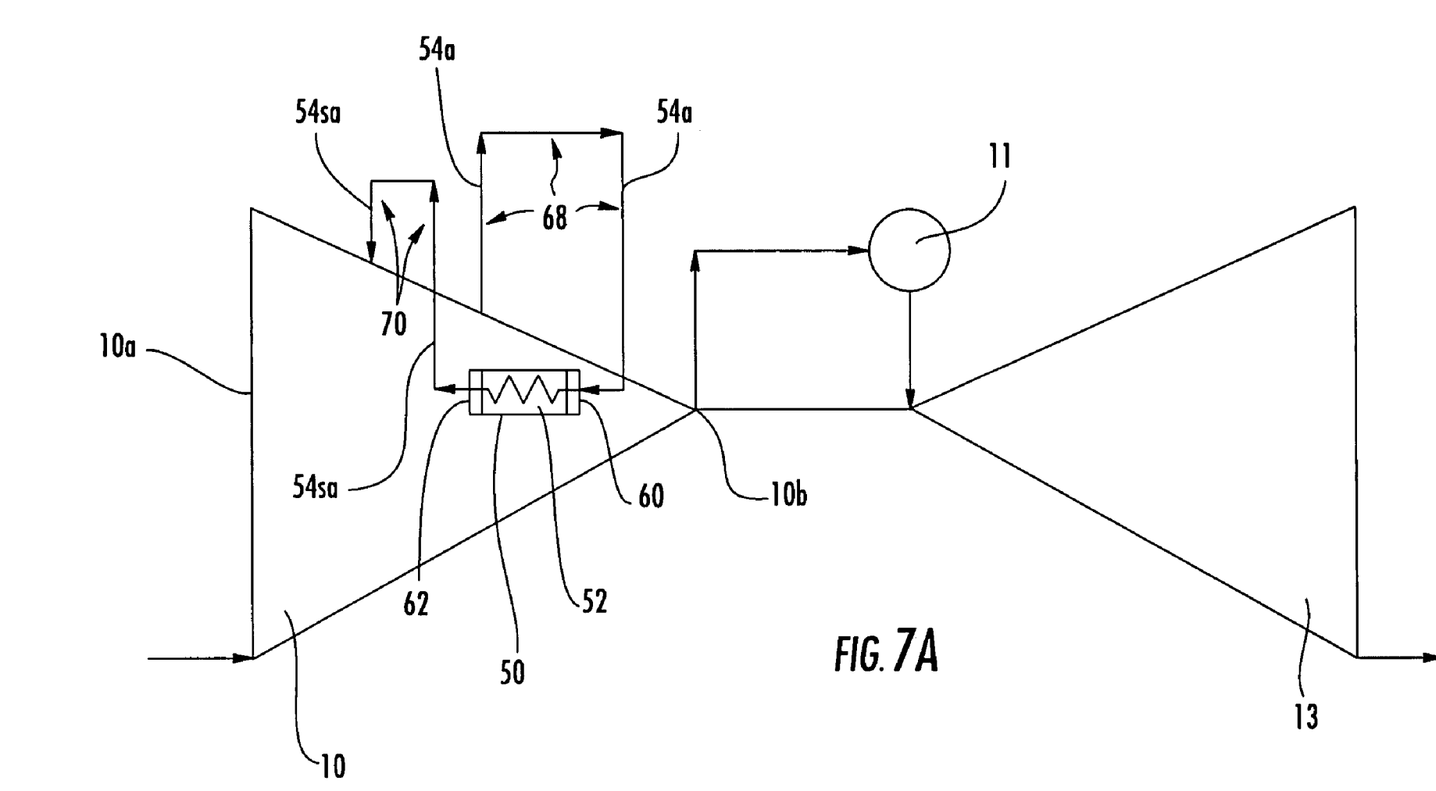
FIG. 7A is a diagrammatic view of a first blade ring cooling system according to aspects of the invention, wherein spent cooling air is returned to the compressor.
Figure 7B:
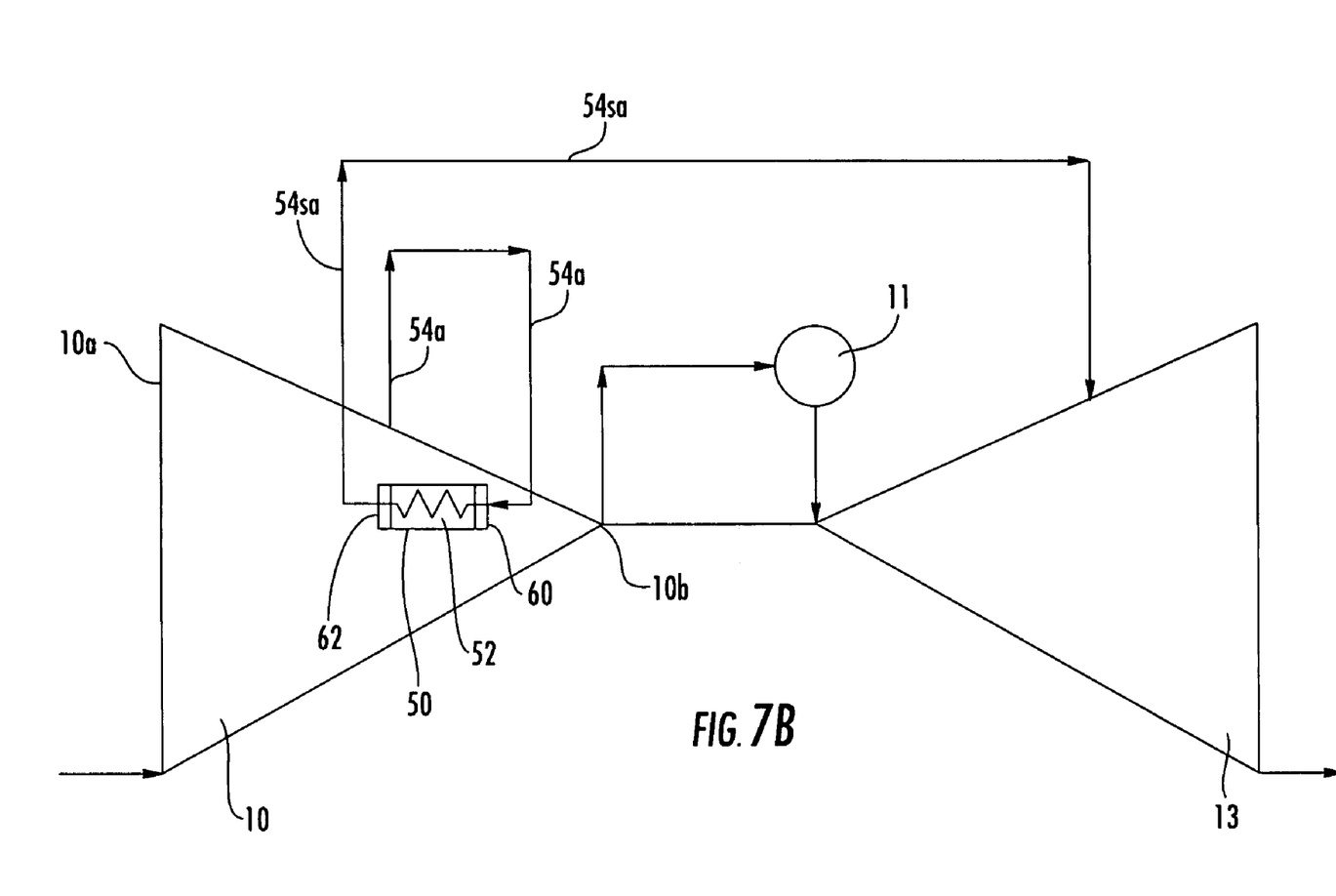
FIG. 7B is a diagrammatic view of the first blade ring cooling system according to aspects of the invention, wherein spent cooling air is alternatively routed to the turbine.

One manner of cooling the vane carrier 50 according to embodiments of the invention is shown in FIGS. 7A and 7B. As shown, the thermal fluid can be air 54a bled or otherwise extracted from the compressor 10. The air 54a can be at a lower temperature than the temperature of the vane carrier 50. In general, the air 54a can be taken from a portion of the compressor 10 that is closer to the compressor inlet 10a than the compressor outlet 10b. In one embodiment, the air 54a can be extracted from a portion of the compressor 10 that is upstream of the vane carrier 50.

The bled compressor air 54a can be routed to the supply plenum 60 by the inlet passage 68, which can be connected, either directly or indirectly, to the compressor 10. The air 54a can pass through the channel 52 so as to exchange heat with the vane carrier 50. Consequently, the temperature of the vane carrier 50 can decrease while the temperature of the air 54a can increase. There are various options for the spent air 54sa exiting the channel 52. In one embodiment, the spent air 54sa can be discharged to the atmosphere (not shown). Depending on the amount of pressure loss during cooling of the vane carrier 50, it may be possible to reinject the spent air 54sa into the compressor gas stream to minimize system losses, as shown in FIG. 7A. Alternatively, the spent air 54sa can be routed to the turbine 13, as shown in FIG. 7B. In the turbine 13, the spent air 54sa can be used for various purposes including, for example, cooling the downstream rows of turbine vanes and/or blades.

Figure 8A:
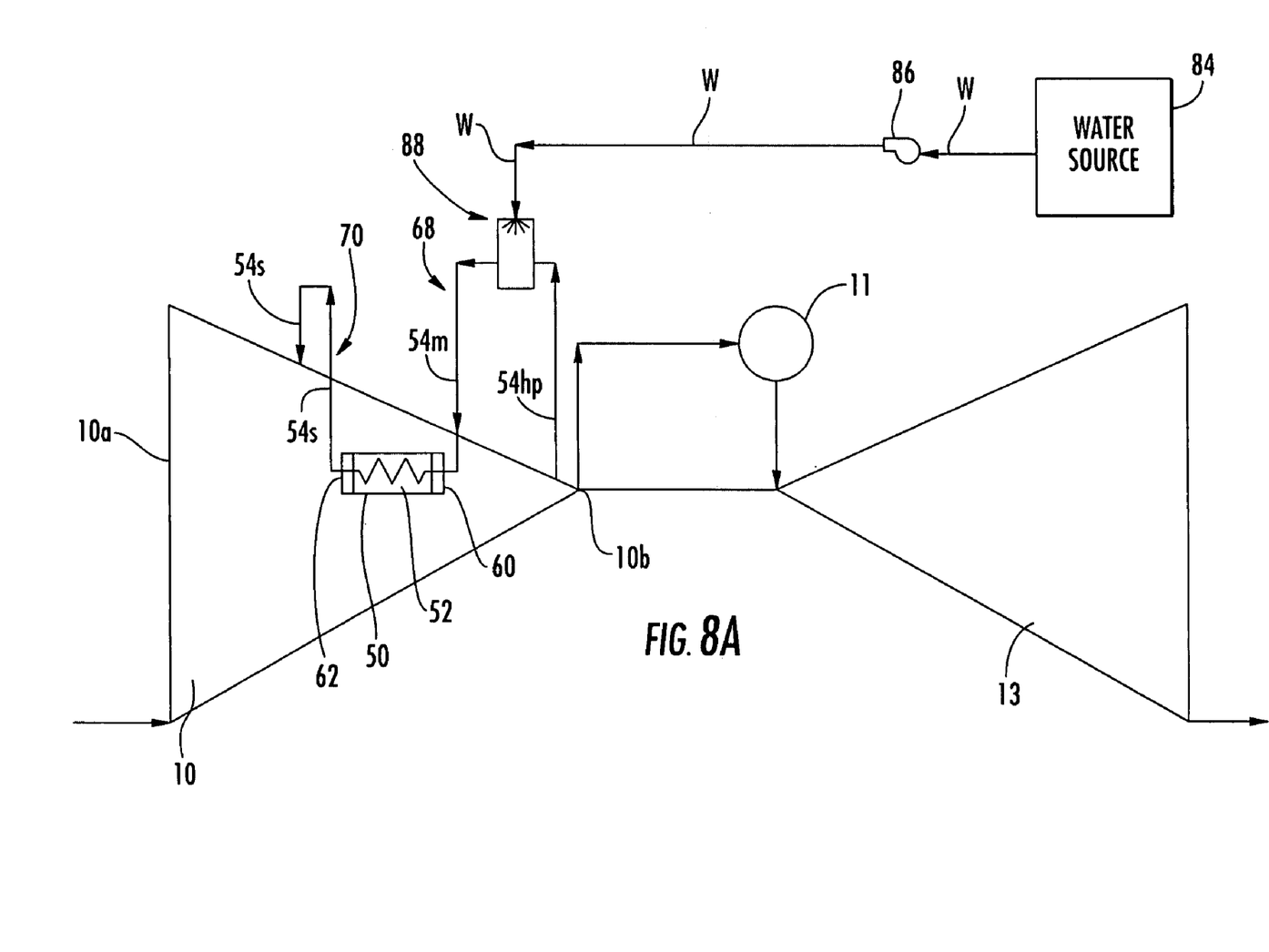
FIG. 8A is a diagrammatic view of a second blade ring cooling system according to aspects of the invention, wherein spent cooling air is returned to the compressor.
Figure 8B:
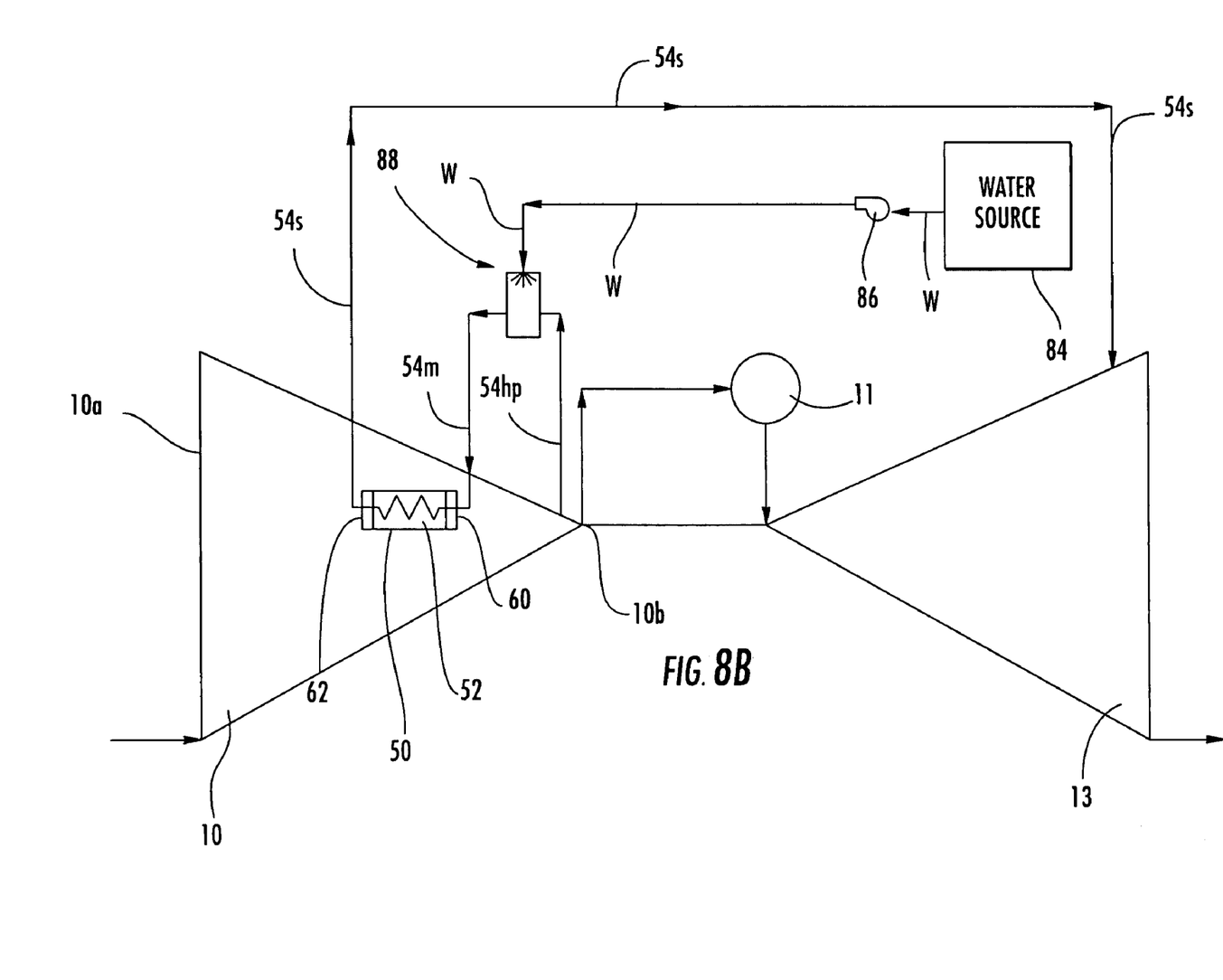
FIG. 8B is a diagrammatic view of the second blade ring cooling system according to aspects of the invention, wherein spent cooling air is alternatively routed to the turbine.

Another system for cooling the vane carrier according to embodiments of the invention is shown in FIGS. 8A and 8B. As shown, high pressure air 54hp can be extracted or bled from the compressor 10. Such high pressure air 54hp can be taken from a portion of the compressor 10 that is closer to the compressor outlet 10b than to the compressor inlet 10a. In one embodiment, the air 54hp can be extracted from a portion of the compressor 10 that is downstream of the vane carrier 50.

The high pressure air 54hp may be at a temperature that is higher than the temperature of the vane carrier 50, or the temperature of the air 54hp may not be sufficiently cool to have an appreciable effect on compressor clearance reduction. In such cases, water W can be introduced into the air 54hp to reduce the temperature of the high pressure air 54hp. The water W can be supplied from any suitable source 84, which can be internal or external to the engine. A pump 86 can be used to facilitate in the routing of the water W to the high pressure air 54hp. In one embodiment, the air 54hp can be spray cooled 88 with the water W to form a moist air mixture 54m.

The moist air 54m can then be used to cool the compressor vane carrier 50. The moist air 54m can be routed to the supply plenum 60 by the inlet passage 68, which can be connected, either directly or indirectly, to the compressor 10. The moist air 54m can travel through the channel 52 in heat exchanging relation with the vane carrier 50. As a result, the temperature of the moist air 54m can increase while the temperature of the vane carrier 50 can decrease.

After exiting the channel 52, the spent moist air 54s can be released to the atmosphere (not shown). In one embodiment, the spent moist air 54s can be reinjected into the compressor 10, as shown in FIG. 8A. Such reinjection of the spent air 54s is preferred because it can minimize losses. Further, the addition of the spent moist air 54s in the compressor 10 can increase the mass flow through the compressor 10, which, in turn, can increase power, utilizing wet compression. Alternatively, the moist spent air 54s can be delivered to the turbine 13, as shown in FIG. 8B. The spent air 54s can be used for turbine cooling, among other possibilities.

Figure 9:
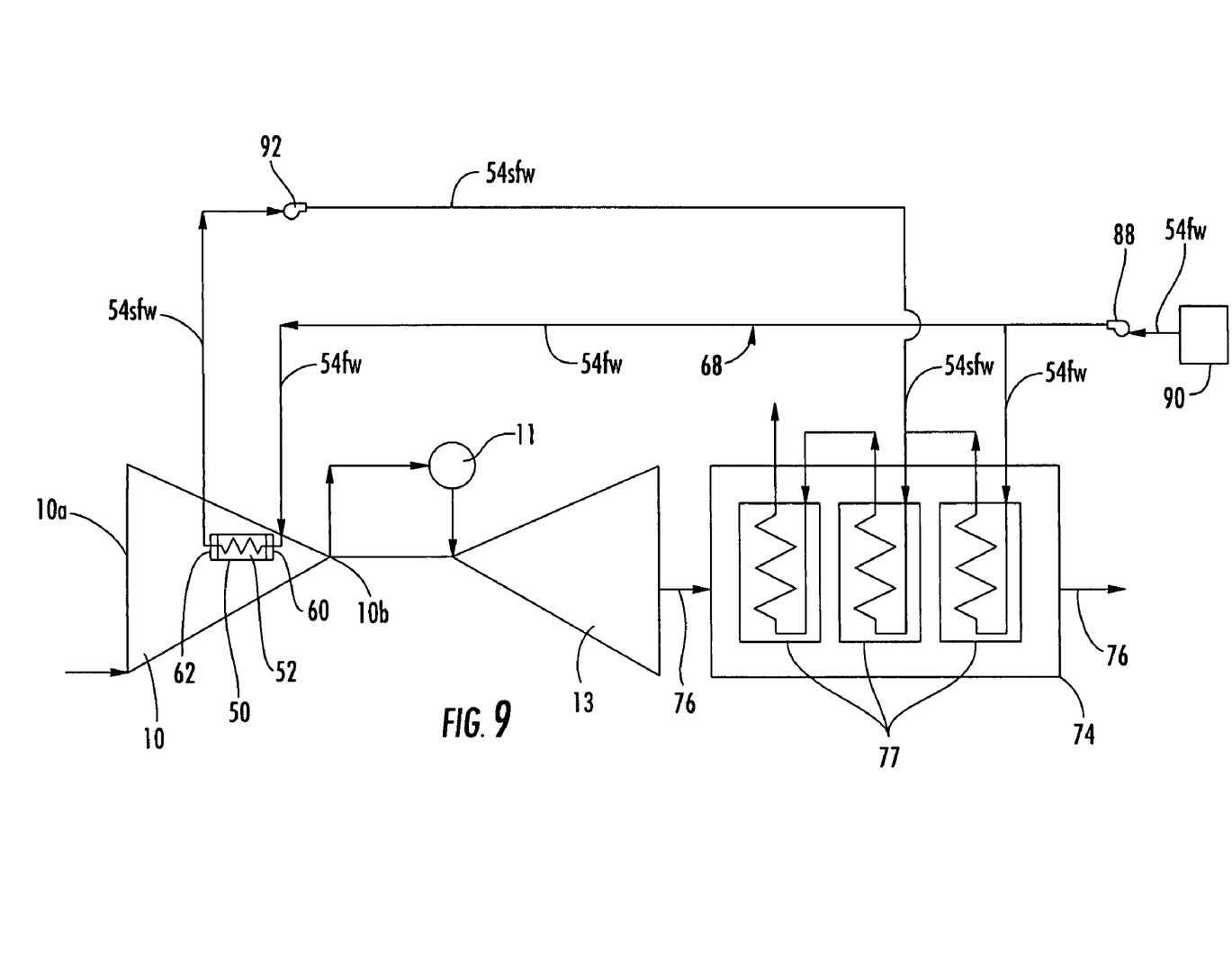
FIG. 9 is a diagrammatic view of a third blade ring cooling system according to aspects of the invention.

Yet another manner of cooling the vane carrier 50 is shown in FIG. 9. As shown, the thermal fluid can be feed water from the bottoming cycle in a combined cycle engine. For example, a portion of high pressure water 54fw from an economizer 90 can be routed to the channel 52. The inlet passage 68 can be directly or indirectly connected in fluid communication with the economizer 90. A pump 88 can be provided to assist in delivery of the water 54fw to the supply plenum 60.

The high pressure economizer water 54fw can then travel through the channel 52 so as to cool the compressor vane carrier 50. Because of the heat exchange between the vane carrier 50 and the water 54fw, the temperature of the water 54fw can increase while the temperature of the vane carrier 50 can decrease. Upon exiting the channel 52, the spent water 54sfw can be routed, by way of a pump 92 or otherwise, to the HRSG 74. In the HRSG 74, the water 54sfw can be mixed with a portion of the economizer water 54fw that was not diverted to the vane carrier 50, thereby reducing cycle thermodynamic losses.

The foregoing description is provided in the context of various systems for heating or cooling a compressor vane carrier to control compressor clearances. It will of course be understood that the invention is not limited to the specific details described herein, which are given by way of example only, and that various modifications and alterations are possible within the scope of the invention as defined in the following claims.

What is claimed is:

1. In a turbine engine having a combustor, a turbine and a compressor, the compressor having an active clearance control system comprising:
   a vane carrier having a plurality of closed channels extending substantially axially therethrough, the plurality of channels being circumferentially spaced from each other, each of the channels having an open first end and an open second end, the vane carrier further including a generally circumferentially extending supply plenum, the supply plenum being connected in fluid communication with the first end of each of the plurality of channels;
   a supply passage being connected in fluid communication with the supply plenum; and
   a discharge passage in fluid communication with the second end of each of the channels, whereby a fluid is passed in heat exchanging relation through each of the channels so as to control the thermal growth and contraction of the vane carrier to thereby control compressor clearances.

2. The system of claim 1 further including a circumferentially extending discharge plenum in the vane carrier, wherein the discharge plenum is connected in fluid communication to the discharge passage and to the second end of each of the channels.

3. The system of claim 1 further including a fluid in the channel.

4. The system of claim 3 wherein the vane carrier is at a first temperature and the fluid is at a second temperature, wherein the second temperature is greater than the first temperature, wherein the temperature of the vane carrier is raised above the first temperature after the fluid passes through the channel, whereby the compressor clearances are enlarged or at least maintained during non-standard operating conditions.

5. The system of claim 3 wherein the vane carrier is at a first temperature and the fluid is at a second temperature, wherein the second temperature is less than the first temperature, wherein the temperature of the vane carrier is lowered below the first temperature after the fluid passes through the channel, whereby the compressor clearances are reduced or at least maintained during operating conditions where improved engine performance is desired.

6. The system of claim 3 wherein the fluid is one of compressor air, economizer water, spray cooled compressor air, turbine exhaust gas, and a thermal fluid.

7. The system of claim 1 wherein the discharge passage is in fluid communication with one of: the compressor, the atmosphere, the turbine, a heat recovery steam generator, and a thermal fluid source fluidly connected to the supply passage.

8. A method of actively controlling compressor clearances comprising the steps of:
   providing a turbine engine with a compressor having a vane carrier with a plurality of closed channels extending substantially axially therethrough, the plurality of channels being circumferentially spaced from each other, each of the channels having an open first end and an open second end, the vane carrier further including a generally circumferentially extending supply plenum, the supply plenum being connected in fluid communication with the first end of each of the plurality of channels, wherein the vane carrier is at a first temperature;
   providing a thermal fluid at a second temperature, wherein the second temperature is greater than the first temperature;
   routing the thermal fluid to the supply plenum so that the thermal fluid passes in heat exchanging relation through each of the plurality of channels so as to increase the temperature of the blade ring above the first temperature, whereby exposure to the thermal fluid causes one of radial expansion of the vane carrier and minimization of radial contraction of the vane carrier.

9. The method of claim 8 further including the step of heating the thermal fluid to the second temperature by passing the thermal fluid in heat exchanging relation with a heat recovery steam generator after engine shutdown.

10. The method of claim 9 further including the step of recirculating the thermal fluid in heat exchanging relation with the heat recovery steam generator, whereby a closed loop heat exchange circuit is formed.

11. The method of claim 8 wherein the turbine engine is a combined cycle engine having a bottoming cycle, further including the step of heating the thermal fluid to the second temperature by passing the thermal fluid in heat exchanging relation with a portion of the bottoming cycle.

12. The method of claim 8 wherein the thermal fluid is turbine exhaust gas, and further including the step of extracting a portion of gas from the engine exhaust.

13. The method of claim 8 wherein the steps of providing and passing are performed at least prior to one of a hot restart or spin cool of the engine.

14. A method of actively controlling compressor clearances comprising the steps of:
   providing a turbine engine with a compressor having a vane carrier with a plurality of closed channels extending substantially axially therethrough, the plurality of channels being circumferentially spaced from each other, each of the channels having an open first end and an open second end, the vane carrier further including a generally circumferentially extending supply plenum, the supply plenum being connected in fluid communication with the first end of each of the plurality of channels, wherein the vane carrier is at a first temperature;
   providing a fluid at a second temperature, wherein the second temperature is lower than the first temperature;
   routing the fluid to the supply plenum so that the fluid passes in heat exchanging relation through each of the plurality of channels so as to lower the temperature of the vane carrier below the first temperature, whereby exposure to the fluid causes one of a radial contraction of the vane carrier and a minimization of radial expansion of the vane carrier.

15. The method of claim 14 wherein the fluid is compressor air, and further including the step of extracting air from a portion of the compressor upstream of the vane carrier.

16. The method of claim 14 wherein the fluid is compressor air, and further including the steps of:
   extracting air from a portion of the compressor downstream of the vane carrier; and spray cooling the extracted air with water.

17. The method of claim 16 further including the step of: discharging the fluid to one of the atmosphere, the gas path of the compressor upstream of the vane carrier, and the turbine portion of the engine.

18. The method of claim 14 wherein the fluid is high pressure water, further including the step of directing high pressure water from an economizer to the channel.

19. The method of claim 18 wherein, after the passing step, the fluid is routed to a heat recovery steam generator.

* * * * *